US007132761B2

(12) United States Patent
Rhodes

(10) Patent No.: US 7,132,761 B2
(45) Date of Patent: Nov. 7, 2006

(54) UNIVERSAL FLEET ELECTRICAL SYSTEM

(76) Inventor: Michael Rhodes, 604 SE. 2nd Ave., Grand Rapids, MN (US) 55744

( * ) Notice: Subject to any disclaimer, the term of this patent is extended or adjusted under 35 U.S.C. 154(b) by 304 days.

(21) Appl. No.: 10/287,491

(22) Filed: Nov. 5, 2002

(65) Prior Publication Data
US 2003/0090153 A1 May 15, 2003

Related U.S. Application Data

(63) Continuation-in-part of application No. 09/985,680, filed on Nov. 5, 2001, now Pat. No. 6,600,236.

(51) Int. Cl.
B60L 1/00 (2006.01)
B60L 1/14 (2006.01)
B60L 1/16 (2006.01)
B60L 3/00 (2006.01)
H02G 3/00 (2006.01)
H02G 5/00 (2006.01)
H02G 5/06 (2006.01)
H02G 5/08 (2006.01)

(52) U.S. Cl. .................................... 307/10.1
(58) Field of Classification Search ............... 307/10.1; 315/77
See application file for complete search history.

(56) References Cited

U.S. PATENT DOCUMENTS

| 4,122,357 | A | * | 10/1978 | Sumida ..................... 307/10.1 |
| 4,403,155 | A | | 9/1983 | Aoki et al. |
| 4,689,718 | A | | 8/1987 | Maue et al. |
| 4,850,884 | A | | 7/1989 | Sawai et al. |
| 4,864,154 | A | | 9/1989 | Copeland et al. |
| 4,956,561 | A | | 9/1990 | Tamer |
| 5,296,840 | A | * | 3/1994 | Gieffers ..................... 340/474 |
| 5,623,169 | A | * | 4/1997 | Sugimoto et al. .......... 307/10.1 |
| 5,703,411 | A | * | 12/1997 | Bella et al. ................ 307/10.1 |
| 5,825,098 | A | * | 10/1998 | Darby et al. ............... 307/10.1 |
| 5,831,515 | A | * | 11/1998 | Stewart et al. ............ 340/384.4 |
| 5,856,711 | A | * | 1/1999 | Kato et al. ................. 307/10.6 |
| 5,949,148 | A | * | 9/1999 | Wagner ..................... 307/10.1 |
| 5,973,409 | A | | 10/1999 | Neibecker et al. |
| 5,990,570 | A | | 11/1999 | Yoshida et al. |
| 5,990,573 | A | | 11/1999 | Granitz et al. |
| 6,049,139 | A | * | 4/2000 | Nagaura et al. ........... 307/10.1 |
| 6,087,777 | A | * | 7/2000 | Long ........................... 315/82 |
| 6,150,734 | A | | 11/2000 | Neibecker et al. |
| 6,154,658 | A | * | 11/2000 | Caci ............................ 455/466 |

(Continued)

OTHER PUBLICATIONS

Installation Instructions for Model SPS8V/6000161 Strobe Power Supply, Federal Signal Corporation.*

(Continued)

Primary Examiner—Robert L. DeBeradinis
Assistant Examiner—Hal I. Kaplan
(74) Attorney, Agent, or Firm—Richard C. Litman

(57) ABSTRACT

The universal fleet electrical system is an integrated system for supplying electrical power to aftermarket accessories, particularly to police vehicles and other emergency vehicles. The system includes a central power distribution panel, which includes a fuse panel and a lighting selector junction box, together with a universal wiring harness. A variety of custom wiring harnesses may also be used in the universal fleet electrical system. A dash mounted console is provided for operator control of the various accessory devices. The lighting selector junction box permits various lighting accessories to be connected to different light level circuits through push connectors, so that a plurality of lighting devices may be controlled by a single switch.

4 Claims, 17 Drawing Sheets

U.S. PATENT DOCUMENTS

| | | | |
|---|---|---|---|
| 6,161,278 A * | 12/2000 | Easter et al. .................. | 29/749 |
| 6,307,279 B1 | 10/2001 | Yoshida et al. | |
| 6,311,637 B1 * | 11/2001 | Moss ......................... | 116/200 |
| 6,396,380 B1 * | 5/2002 | Girke et al. ................ | 337/189 |
| 6,411,874 B1 | 6/2002 | Morgan et al. | |
| 6,577,025 B1 * | 6/2003 | Hentschel et al. ......... | 307/10.1 |
| 6,600,236 B1 * | 7/2003 | Rhodes ..................... | 307/10.1 |
| 6,614,128 B1 * | 9/2003 | Mizuguchi et al. ........ | 307/10.1 |
| 6,674,182 B1 * | 1/2004 | Maynard et al. ........... | 307/10.8 |
| 6,687,639 B1 * | 2/2004 | Taniguchi et al. .......... | 702/117 |
| 6,749,437 B1 * | 6/2004 | Chan .......................... | 434/393 |
| 2001/0002774 A1 * | 6/2001 | Lee ............................ | 307/147 |
| 2002/0118518 A1 * | 8/2002 | Orcutt et al. ............... | 361/748 |
| 2002/0161820 A1 * | 10/2002 | Pellegrino et al. .......... | 709/201 |
| 2003/0105568 A1 * | 6/2003 | Melnyk et al. ............... | 701/36 |
| 2004/0027000 A1 * | 2/2004 | Beeren ...................... | 307/10.1 |

OTHER PUBLICATIONS

Installation Instructions for Model SPS8 Strobe Power Supply, Federal Signal Corporation.*

* cited by examiner

UNIVERSAL FLEET ELECTRICAL SYSTEM

CROSS-REFERENCE TO RELATED APPLICATION

This is a continuation-in-part of my prior application Ser. No. 09/985,680 filed Nov. 5, 2001, now U.S. Pat. No. 6,600,236.

BACKGROUND OF THE INVENTION

1. Field of the Invention

The present invention relates to motor vehicle electrical systems, and particularly to a universal fleet electrical system for fleets of emergency vehicles, such as police vehicles.

2. Description of the Related Art

Law enforcement agencies typically have large fleets of motor vehicles which require a wide variety of aftermarket accessories, including, but not limited to, radios, light bars, arrow sticks, flashers for high beams, grill lights, brake and backup lights, strobe lights, dash lights, rear deck lighting, mobile dispatch terminals, video cameras, and computers. Original equipment manufacture (OEM) police packages offer base packages which are very expensive and which do not begin to provide the capability of handling all accessory needs. State agencies and local government entities have tight budgetary constraints which require that accessory systems be put up for bid to local vendors. Unfortunately, wiring systems vary from vendor to vendor, and often accessories must be hard wired by tapping into the vehicle's existing wiring system. As accessories accumulate, the vehicle's accessory wiring system becomes very complex with no unifying schematic. Consequently, when an accessory fails, it becomes very difficult and time consuming to track down the fault through the vehicle's wiring system.

Various inventions have sought to simplify vehicle wiring systems to make electrical systems more economical and to reduce the cost of servicing vehicle electrical systems. U.S. Pat. No. 4,403,155, issued September, 1983 to Aoki et al., describes a wiring system which eliminates external jumper wires by housing a switch box and fuse box in a connector box with buss bars which branch to terminals and split terminals leaving the connector box. U.S. Pat. No. 4,689,718, issued August, 1987 to Maue et al., teaches a junction box with circuit boards inside, and a top cover having sockets which receive standard wire harnesses, customized buss bars selected by vehicle options, and any additional components required by the accessory circuits.

U.S. Pat. No. 4,850,884, issued July, 1989 to Sawai et al. shows a junction box to which a controller and a wire harness attach, the junction box having buss bars inside. U.S. Pat. No. 4,864,154, issued September, 1989 to Copeland et al., discloses a device for shutting down auxiliary devices in a police car which are not connected to or controlled by the ignition switch, e.g., radios, public address, etc., so that the battery does not run down, the device comprising a timer circuit between the battery and the auxiliary device.

U.S. Pat. No. 4,956,561, issued September, 1990 to A. B. Tamer, describes a smart power connector for carrying multiplexed data signals between a central control module and peripheral control modules. U.S. Pat. No. 5,949,148, issued September, 1999 to W. F. Wagner, teaches a power connection box with fused circuits and relays to control various devices on a police car or other emergency vehicle. The box is mounted under the dash, receives one wire from the positive terminal of the battery and a second wire from the ignition switch. The box provides some output terminals which are always hot, some output terminals which are hot only so long as the ignition switch is on, and some output terminals which are hot with the ignition on but with a delay to keep them hot for a predetermined time when the ignition is turned off, and fused circuit pass throughs for connecting a light controller to the light bar. The device uses a tamer integrated circuit and a flip-flop.

U.S. Pat. Nos. 5,973,409 and 6,150,734, issued October, 1999 and November 2000, respectively to Neibecker et al., show a system having a case including a signal distribution board and a power distribution board which are connected by a first card with fuses and a second card with relays. U.S. Pat. Nos. 5,990,570 and 6,307,279, issued November, 1999 and October, 2001, respectively to Yoshida et al., disclose a solid state power distribution device for eliminating fuses and reducing wiring requirements. U.S. Pat. No. 5,990,573, issued November, 1999 to Granitz et al. describes a plurality of area modules distributed at various locations near the loads throughout a vehicle, each area module having a plurality of slots for receiving feature modules.

U.S. Pat. No. 5,296,840, issued Mar. 22, 1994 to W. J. Gieffers and assigned to Federal Signal Corporation, describes a programmable emergency signalling system for a vehicle which includes a control head mounted in the dash area of the vehicle, a programmable control unit in the trunk of the vehicle, and a serial communications cable linking the control head to the control unit. The control unit is programmed by a keypad which may be integral with the control head, or which may be on a laptop computer that can be connected to the control head. Relays for switching the lights, sirens, or other accessories are connected to the control unit. The system is an add on, however, and does not disclose a universal wiring system and harness adapted for connection to the control head and control unit.

U.S. Pat. No. 6,411,874, issued Jun. 25, 2002 to Morgan, et al., discloses a control system for a police car or other emergency vehicle having a user interface, preferably with a "touch screen" keypad, disposed in the passenger compartment which is connected to a central controller in the trunk of the vehicle by a data bus. The system reduces clutter in the passenger compartment by reduction of multiple switch controls in the passenger compartment. The Morgan patent does not describe such a control system integrated into a universal harness controlling all vehicle electrical functions.

None of the above inventions and patents, taken either singularly or in combination, is seen to describe the instant invention as claimed. Thus a universal fleet electrical system solving the aforementioned problems is desired.

SUMMARY OF THE INVENTION

The universal fleet electrical system is an integrated system for supplying electrical power to aftermarket accessories, particularly to police vehicles and other emergency vehicles. The system includes a central power distribution panel, which includes a fuse panel and a lighting selector junction box, together with a universal wiring harness. A variety of custom wiring harnesses may also be used in the universal fleet electrical system. A dash mounted console is provided for operator control of the various accessory devices. The lighting selector junction box permits various lighting accessories to be connected to different light level circuits through push connectors, so that a plurality of lighting devices may be controlled by a single switch.

The universal wiring harness includes wiring harnesses and connectors connected to various spare switch-controlled circuits as additional accessories are added to the vehicle. Troubleshooting and maintenance are facilitated by color coding and labeling of the wires in the harness. Connection of remote accessories, such as a light bar mounted on the vehicle roof, is facilitated through a novel weatherproof boot connector, rather than hard wiring the light bar to the harness. The wiring harness features various convenience features, such as industrial braiding to reduce harness cable diameter under carpeting and molding.

The universal fleet electrical system may also be designed for systems which use a multipurpose controller on the console connected to relays in the trunk, or, a programmable control head connected to a control unit in the trunk, for reducing the number of switch heads and switch wiring in the console area. In this case power leads for the controller are incorporated into the wiring harness, as well as a serial communications cable extending between the console and the trunk.

Accordingly, it is a principal object of the invention to eliminate the time and expense involved in tapping additional aftermarket accessories into an existing vehicle electrical system by providing a universal fleet electrical system for distributing electrical power to aftermarket accessories in police and emergency vehicles.

It is another object of the invention to reduce the time an expense of troubleshooting failed aftermarket accessories in fleet vehicles through a universal fleet electrical system having standardized cable runs identified by color coding and labeling.

It is a further object of the invention to provide a universal fleet electrical system having a wiring harness with spare circuits having wiring connectors located at various locations within the vehicle for quick addition of aftermarket accessories to the vehicle.

Still another object of the invention is to provide a universal fleet electrical system having an improved harness using industrial braiding and weatherproof connectors for convenient routing of vehicle wiring.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a universal fleet electrical system for controlling power distribution of aftermarket accessories in an emergency vehicle, and particularly in a police vehicle. It will be understood that although the present invention is described with respect to a police vehicle, the principles of the present invention may also be applicable to ambulances, fire chief vehicles, paramedic vehicles, sheriff's vehicles, and the like.

Figure 1:
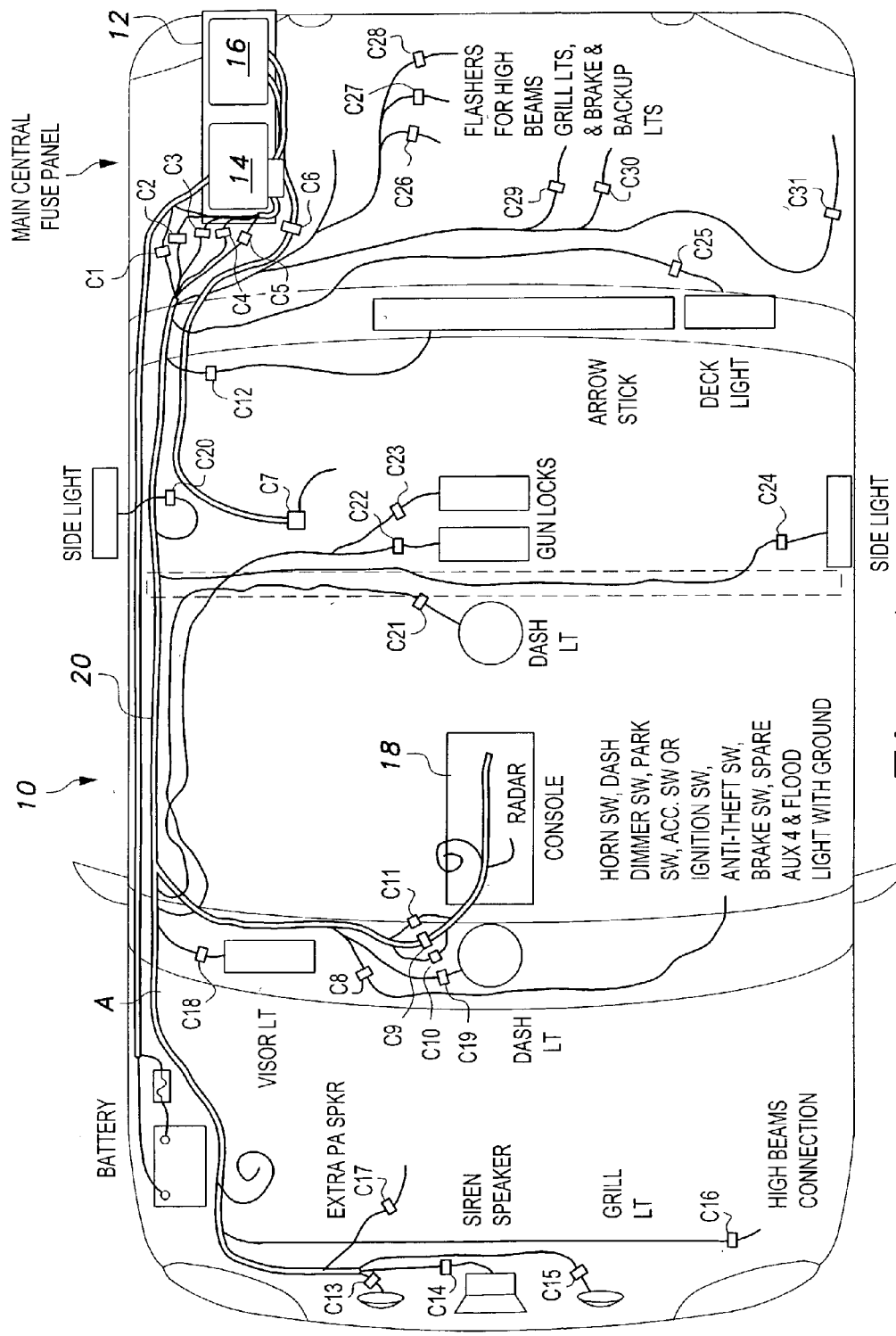
FIG. 1 is a schematic view of a universal fleet electrical system as seen from the top of a police vehicle showing disposition of the components of the system according to the present invention.

FIG. 1 is a schematic diagram showing the preferred layout of the universal fleet system 10 components in a police vehicle A. The system includes a standardized power distribution panel 12, which encompasses a fuse panel 14 and a lighting selector junction box 16. The power distribution panel 12 is preferably disposed in the trunk of the vehicle A. The system 10 also includes a console panel 18 disposed in or under the dash of the vehicle A, the console panel 18 having a plurality of user operated switches for controlling various electrical circuits in the system. Finally, the system 10 includes a universal wiring harness 20 having a plurality of connectors numbered C1–C31 disposed at predetermined locations in the vehicle A for connecting aftermarket accessories to the electrical system. The wiring is color coded and stamped with indicia for circuit identification in order to facilitate maintenance and service of the universal fleet electrical system 10.

Preferably the wiring harness 20 includes sixteen standard connectors designated C1–C16, and optionally may include an additional fifteen connectors C17–C31. The position and function of the connectors are as indicated in the following table.

| Wiring Harness Connectors | | |
|---|---|---|
| C1 | Trunk | Main distribution |
| C2 | Trunk | Main distribution |
| C3 | Trunk | Main distribution |
| C4 | Trunk | Main distribution |
| C5 | Trunk | Main distribution |
| C6 | Trunk | Main distribution |
| C7 | Roof | Light bar |
| C8 | Dash | Horn ring bypass |
| C9 | Dash | Console panel |
| C10 | Dash | Console panel |
| C11 | Dash | Console panel |
| C12 | Deck | Arrow stick |
| C13 | Front | Grill lights |
| C14 | Front | Siren speaker |
| C15 | Front | Grill lights |
| C16 | Front | Headlights |
| C17 | Front | Extra PA speaker |
| C18 | Dash | Visor light |
| C19 | Dash | Dash light |
| C20 | Side | Right side light |

-continued

Wiring Harness Connectors

| C21 | Roof | Dome light |
| C22 | Interior | Gun lock |
| C23 | Interior | Gun lock |
| C24 | Side | Left side light |
| C25 | Deck | Deck light |
| C26 | Trunk | Flasher for hi-beams |
| C27 | Trunk | Flasher for grill lights |
| C28 | Trunk | Brake & back-up flasher |
| C29 | Trunk | Siren option |
| C30 | Trunk | Scale charger |
| C31 | Trunk | Camera control |

The wiring harness 20 includes several spare circuits throughout the harness run, which may be accessed at the front of the vehicle, at the dash or console panel 18, in the trunk, etc.

The wiring harness 20 includes several features which are improved over conventional accessory harnesses. For example, conventional wiring harnesses are protected by encasing the harness in a hard, corrugated plastic tube which is split longitudinally. In the wiring harness 20 of the present invention the cables are braided loosely in order to present a flat profile and reduce harness diameter under carpeting and molding. In conventional wiring harnesses, the harness for the light bar is hard wired and extends through the roof, so that it is necessary to remove the roof upholstery and pull the wiring through the roof for replacement or servicing. The wiring harness 20 of the present invention includes a special 90° weatherproof boot connector 304 at C-7 for attachment to the light bar 306, so that if the light bar 306 needs to be removed for service, the boot 304 can be removed and a plug can be placed over the roof connector. The boot connector 304 uses a through-the-roof base 302 going through the roof of the vehicle and a wiring harness having a 90° weatherproof boot 304 which removably attaches to the base connector 302 and which connects to a light bar accessory 306 mounted on the roof of the police vehicle A.

Figure 2A:
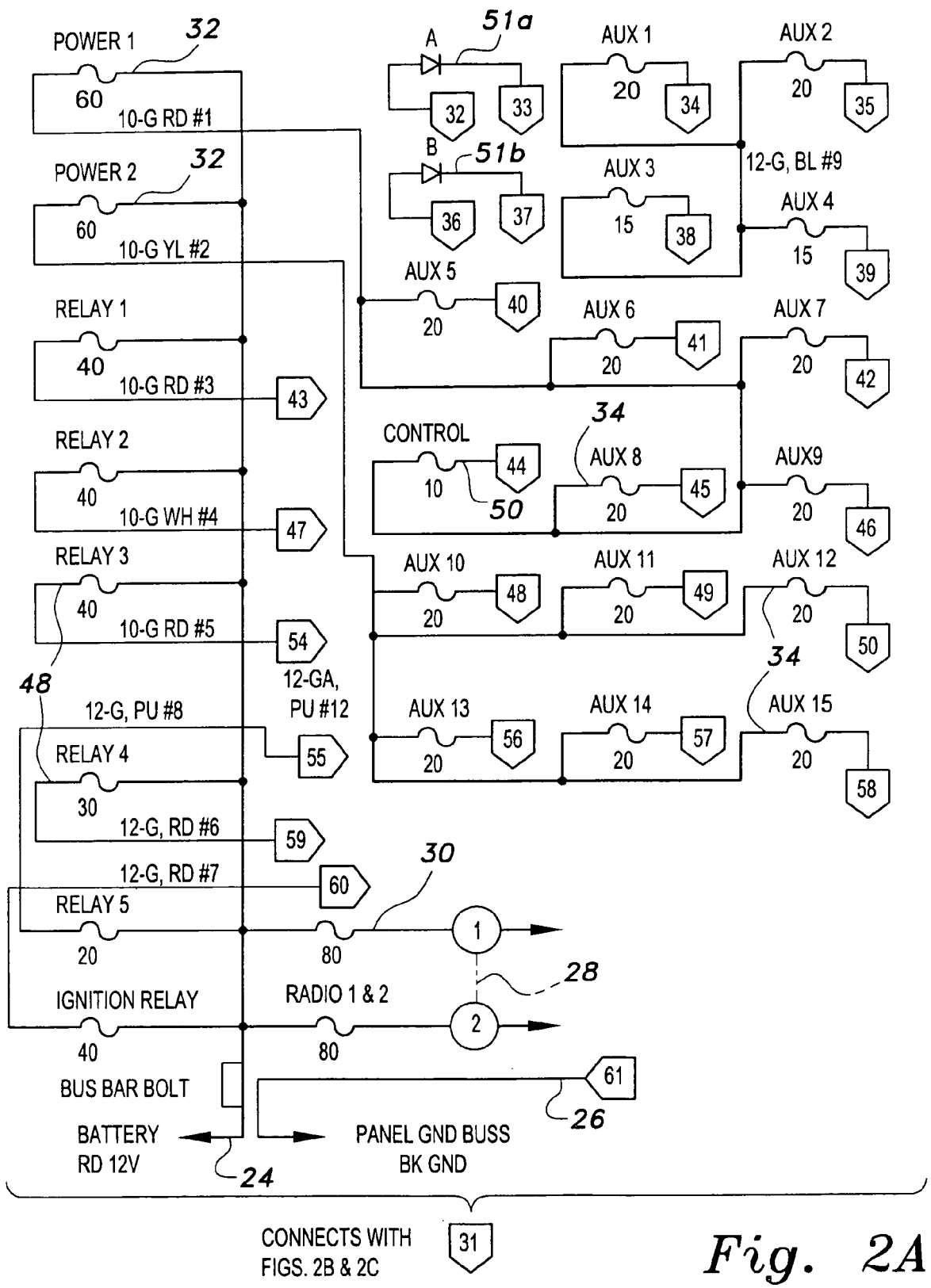
FIGS. 2A, 2B, 2C is a schematic drawing of a fuse panel in the universal fleet electrical system according to the present invention.
Figure 2B:
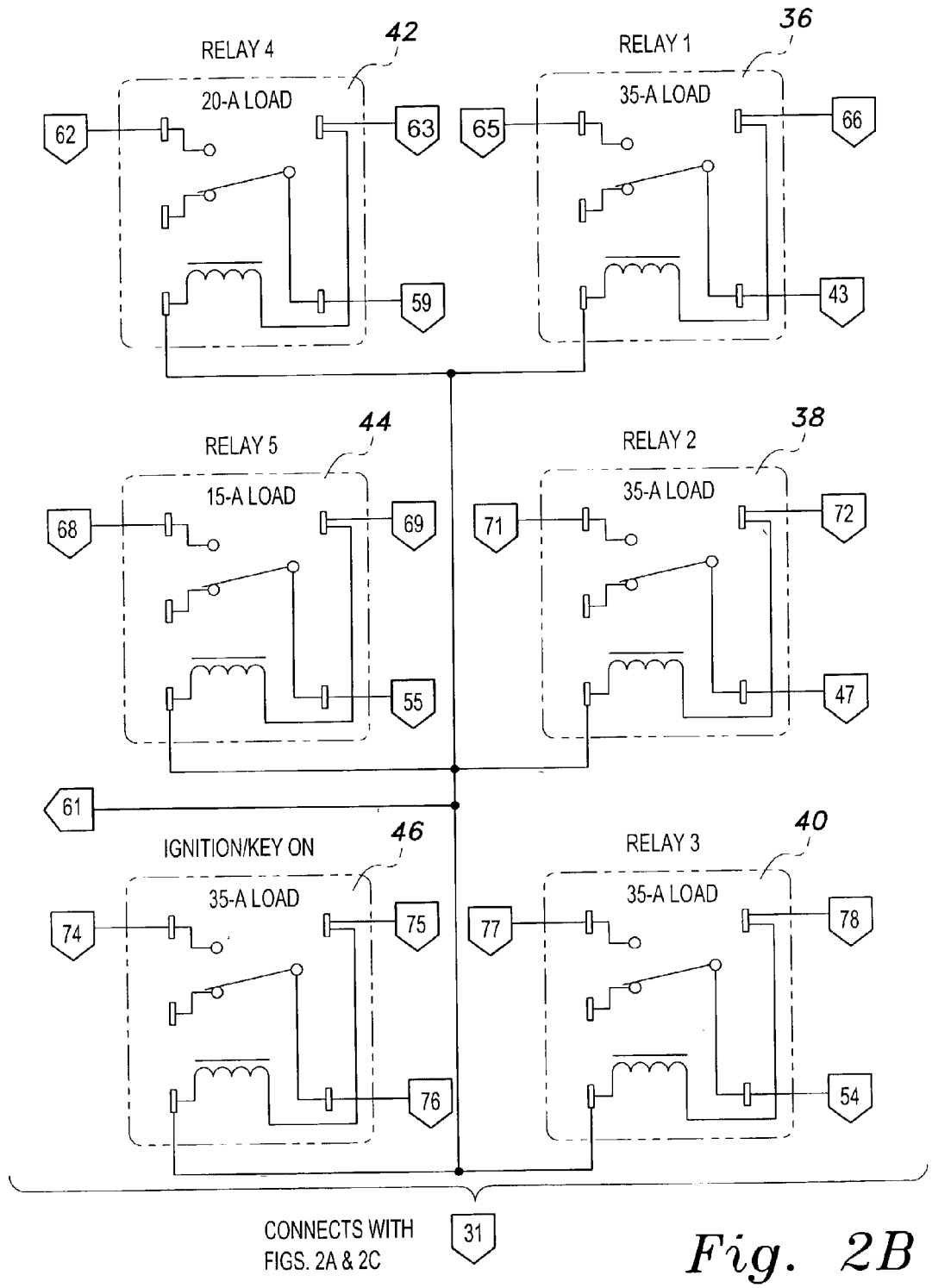
Figure 2C:
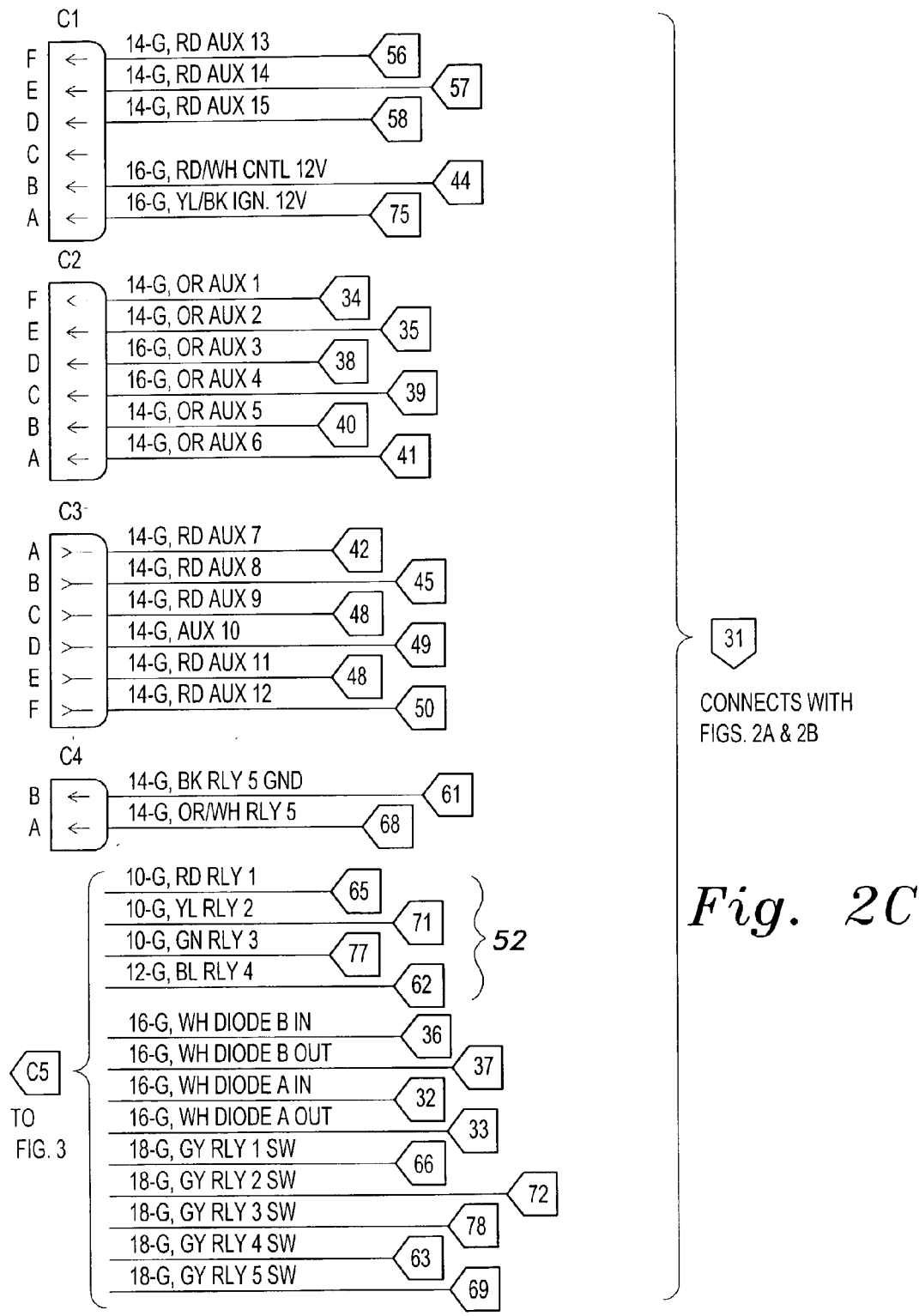

FIGS. 2A–2C is a schematic drawing of the fuse panel 14. The fuse panel 14 has a positive 12 volt buss bar 24 connected directly to the positive terminal of the vehicle battery and a ground buss 26 connected directly to the negative terminal of the battery, or to a vehicle ground on the engine. There is a buss bar 28 connected to a high amperage fuse 30, e.g., 80 amperes, for protection of high amperage accessories such as high power police radios, which are always hot so that the radios may be operated without turning the ignition switch on. The fuse panel 14 provides main power fuses 32 for the accessory circuits, which are further divided into a plurality of auxiliary subcircuits which are individually protected by auxiliary fuses 34. Also mounted on the fuse panel 14 are five relays 36, 38, 40, 42, 44 which are connected to switches on the console panel 18 (described below), and an ignition relay 46 connected to the ignition switch (described below). Each of the relays 36, 38, 40, 42, 44, and 46 is separately protected by a relay fuse 48 connected to the pole of the relay switch. A control fuse 50 is connected between the positive buss bar 24 and one contact of the console switches (described below) in order to protect the solenoid coils in the relays 36–44.

In FIG. 2 auxiliary circuits 1–4 are connected to ignition relay 46, so that power is applied to these circuits only when the ignition key is turned to the "on" or "ACC" position. Auxiliary circuits 5–15 are always hot, so that power is applied to the accessory devices when the console switch (described below) is turned on to energize the solenoid coils in relays 36–44 to close the normally open contacts. The wiring to connectors C1–C3 is color coded to reflect this difference, the ignition controlled auxiliary circuits 1–4 having orange insulation on the wires and auxiliary circuits 5–15 having red insulation.

A pair of diodes 51a and 51b are also mounted on the fuse panel 14. The purpose of the diodes is to prevent feedback when accessories are connected to more than one light level control switch on the console panel 18, as described below.

Figure 3A:
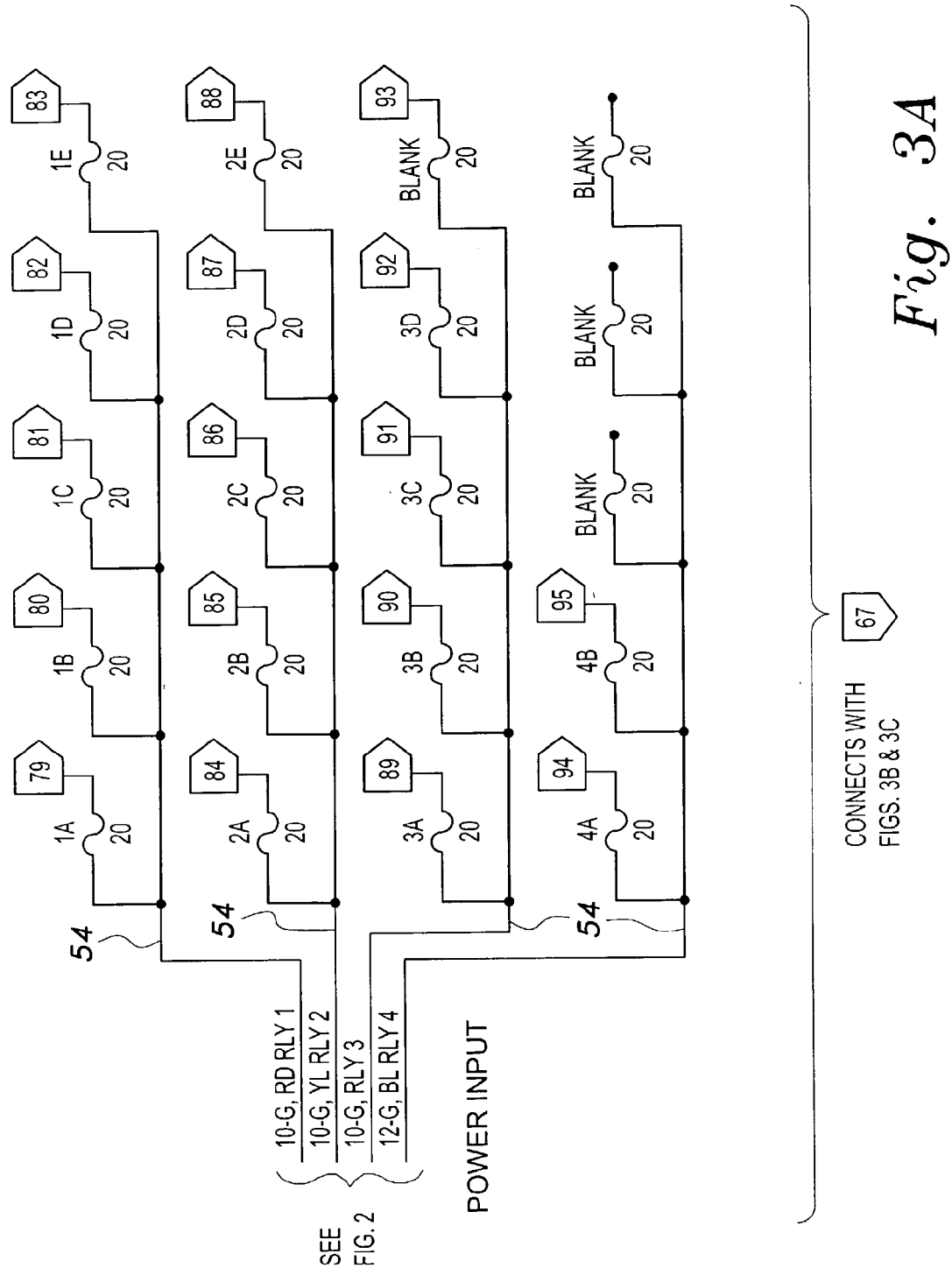
FIGS. 3A, 3B, 3C is a schematic drawing of a lighting selector junction panel in the universal fleet electrical system according to the present invention.
Figure 3B:
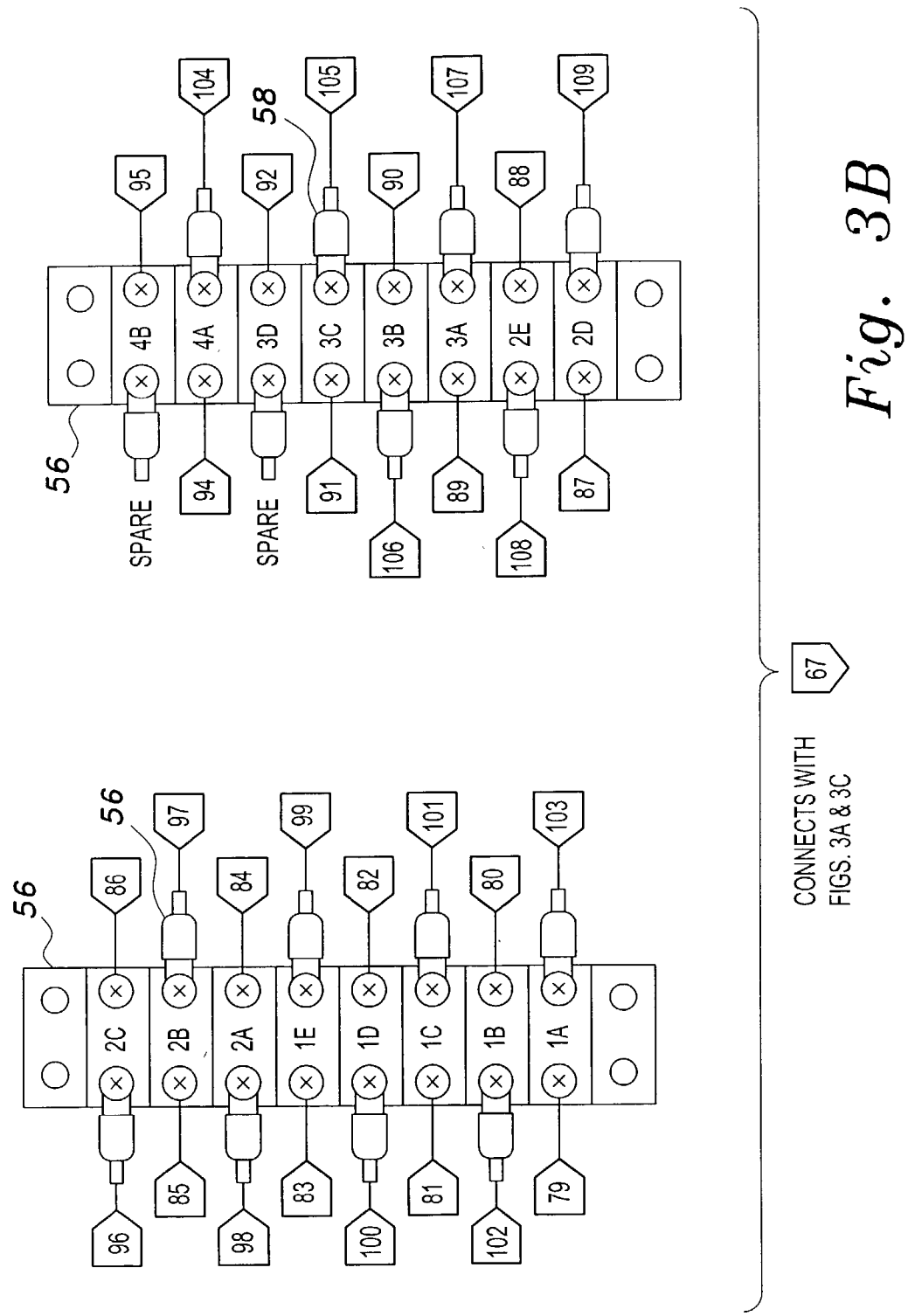
Figure 3C:
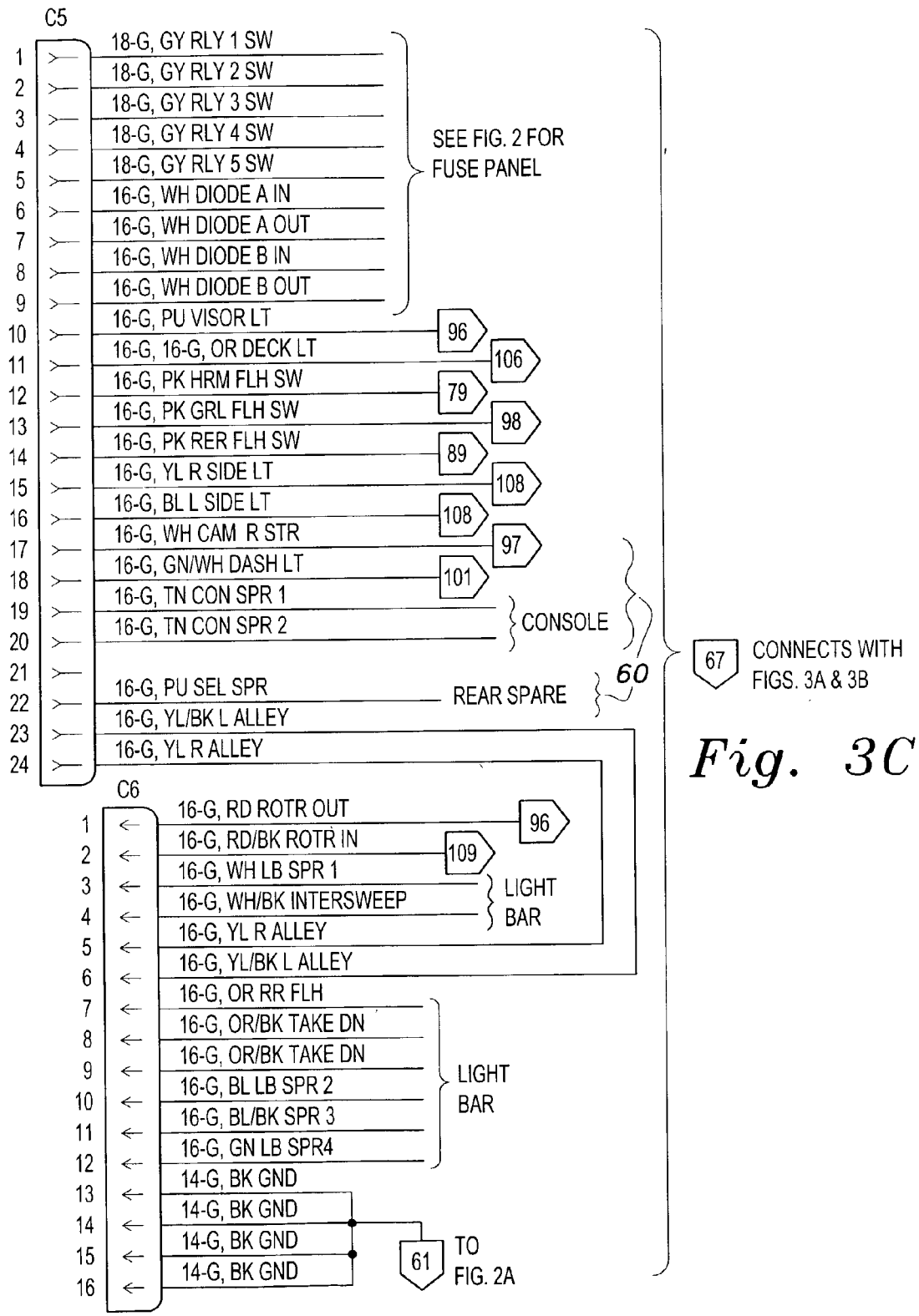

FIGS. 3A–3C is a schematic diagram of the lighting selector junction box 16 panel. The lighting selector junction box 16 receives power input from Relays 1–4 36, 38, 40, and 42 via wires 52, which are colored coded red, yellow, green and black, respectively, to distinguish the power input from the different relays. The power input from each relay is further split up into five parallel branches, each branch protected by a fuse 54 and connected to a terminal block 56. As shown in FIG. 3, some of the branches from Relay 3 40 and Relay 4 42 are left vacant to allow room for future expansion as more accessories are added to the emergency vehicle. Various lighting accessories are connected to the branch circuits by conventional spade terminal push connectors 58 connected to the terminal blocks 56. This arrangement permits very quick customization of the particular light accessories controlled by each relay 36, 38, 40 and 42, thereby enabling power to a number of accessories to be controlled by a single switch, and permitting multiple light level switches, as described below. Wiring to the individual accessory loads is delivered to the lighting selection junction box 16 via connectors C-5 and C-6. It will be noted that some of the wires delivered to the light selection junction box 16 through connectors C5 and C6 are spare wires 60 from the console panel and light bar connectors, which are therefore available for future expansion as accessories are added to the vehicle. The spare wires 60 are color coded so that their origin and destination may be clearly determined.

Figure 4A:
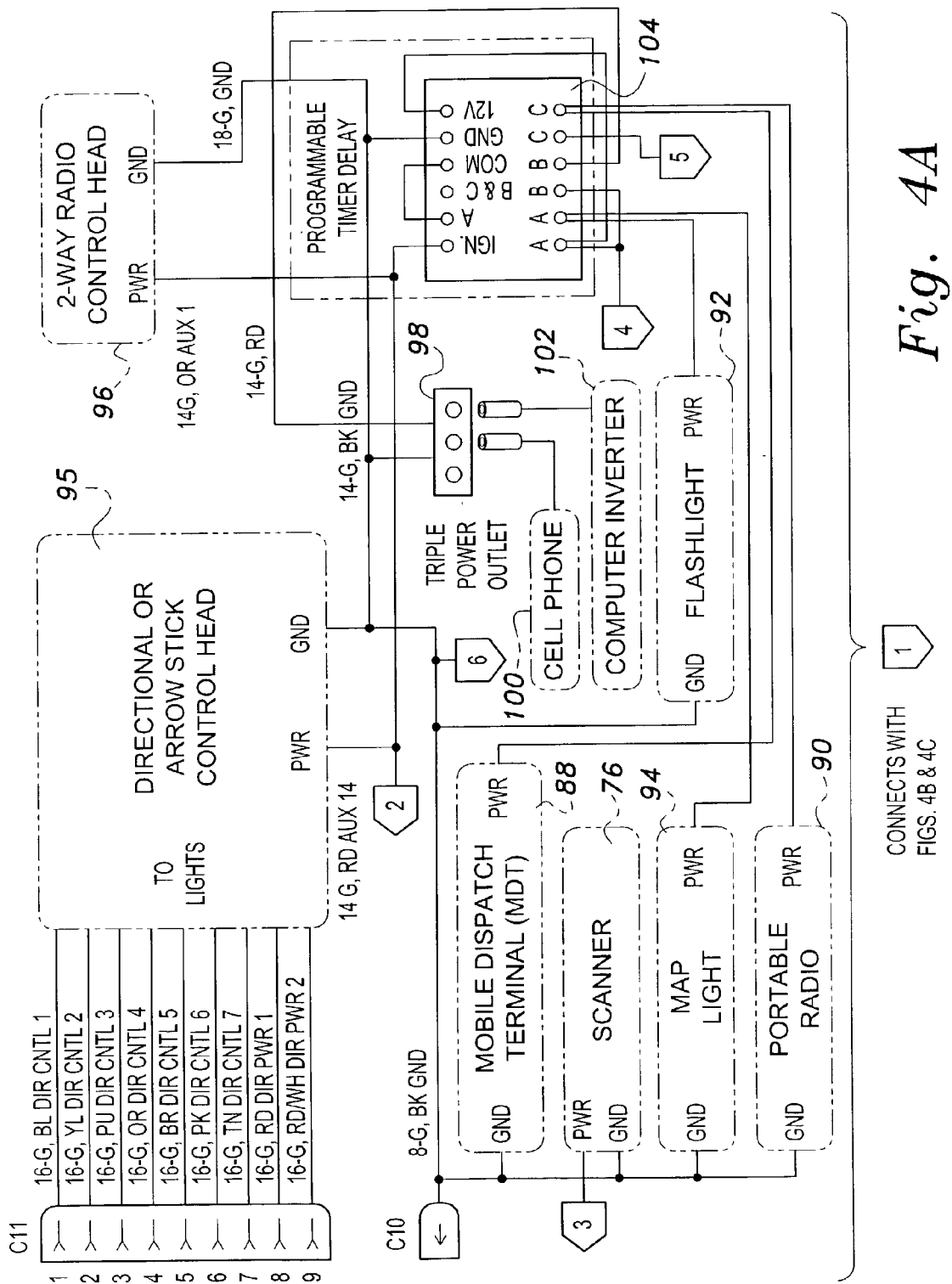
FIGS. 4A, 4B, 4C is a schematic drawing of a console panel in the universal fleet electrical system according to the present invention.
Figure 4B:
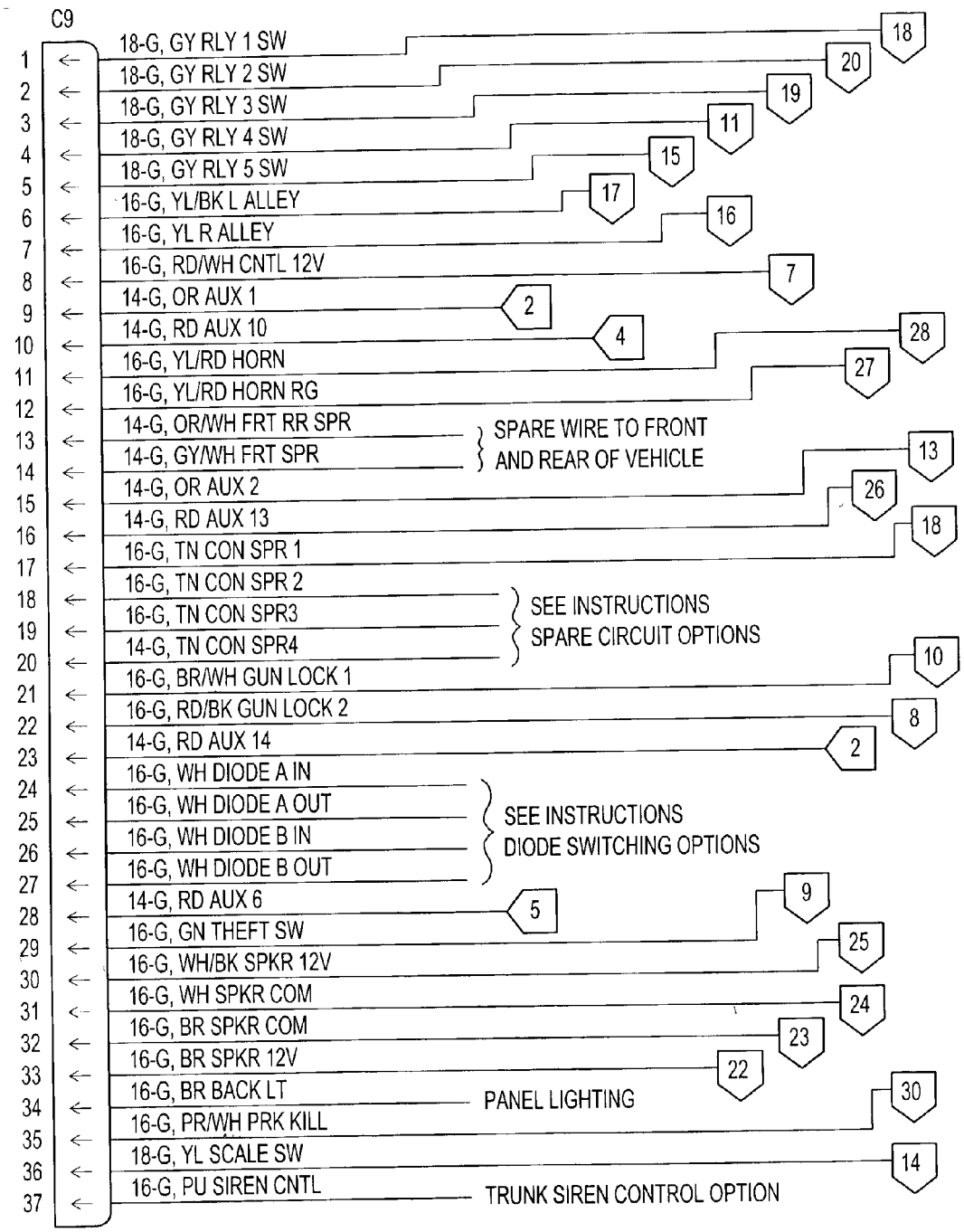
Figure 4C:
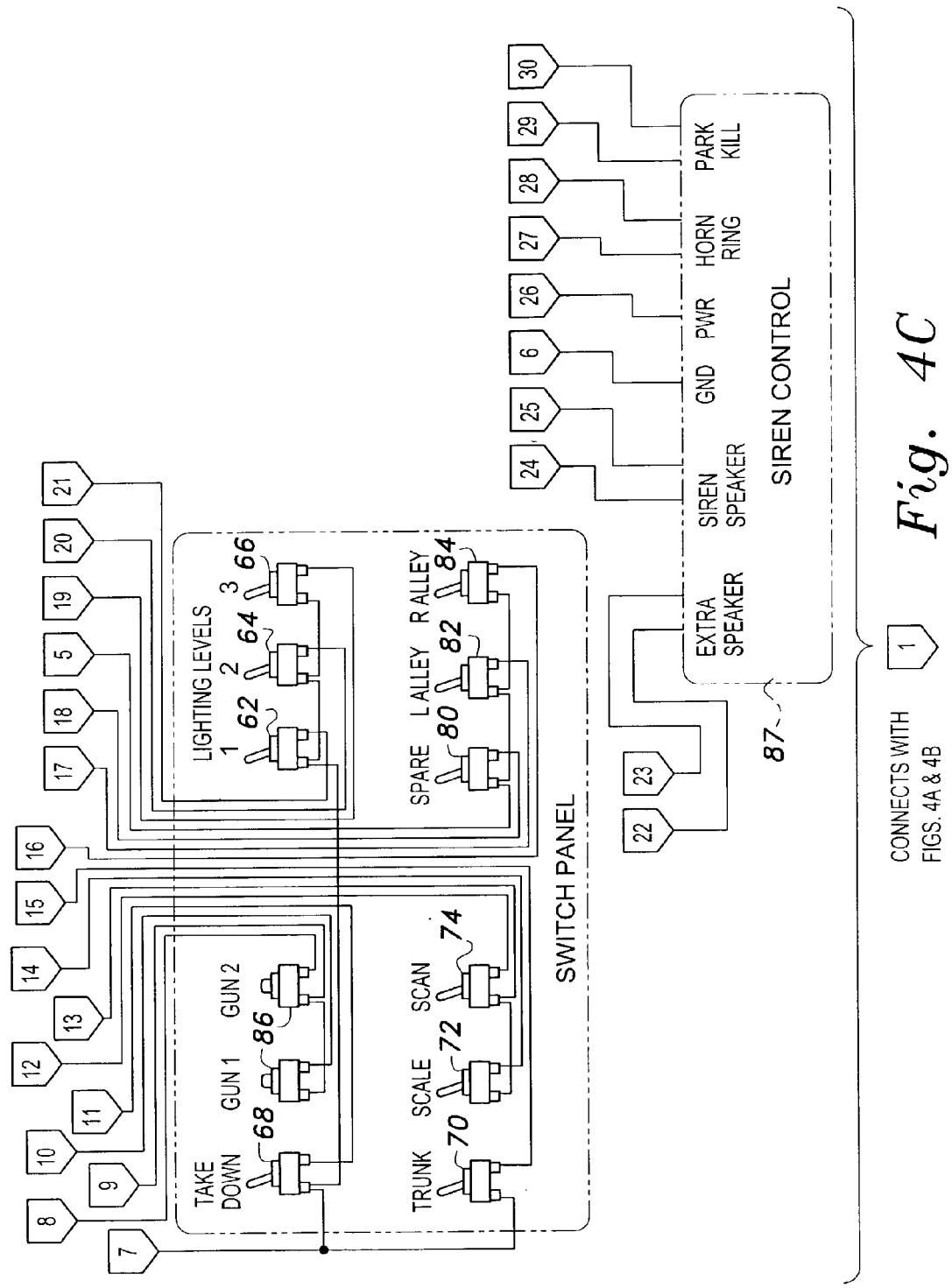
Figure 5A:
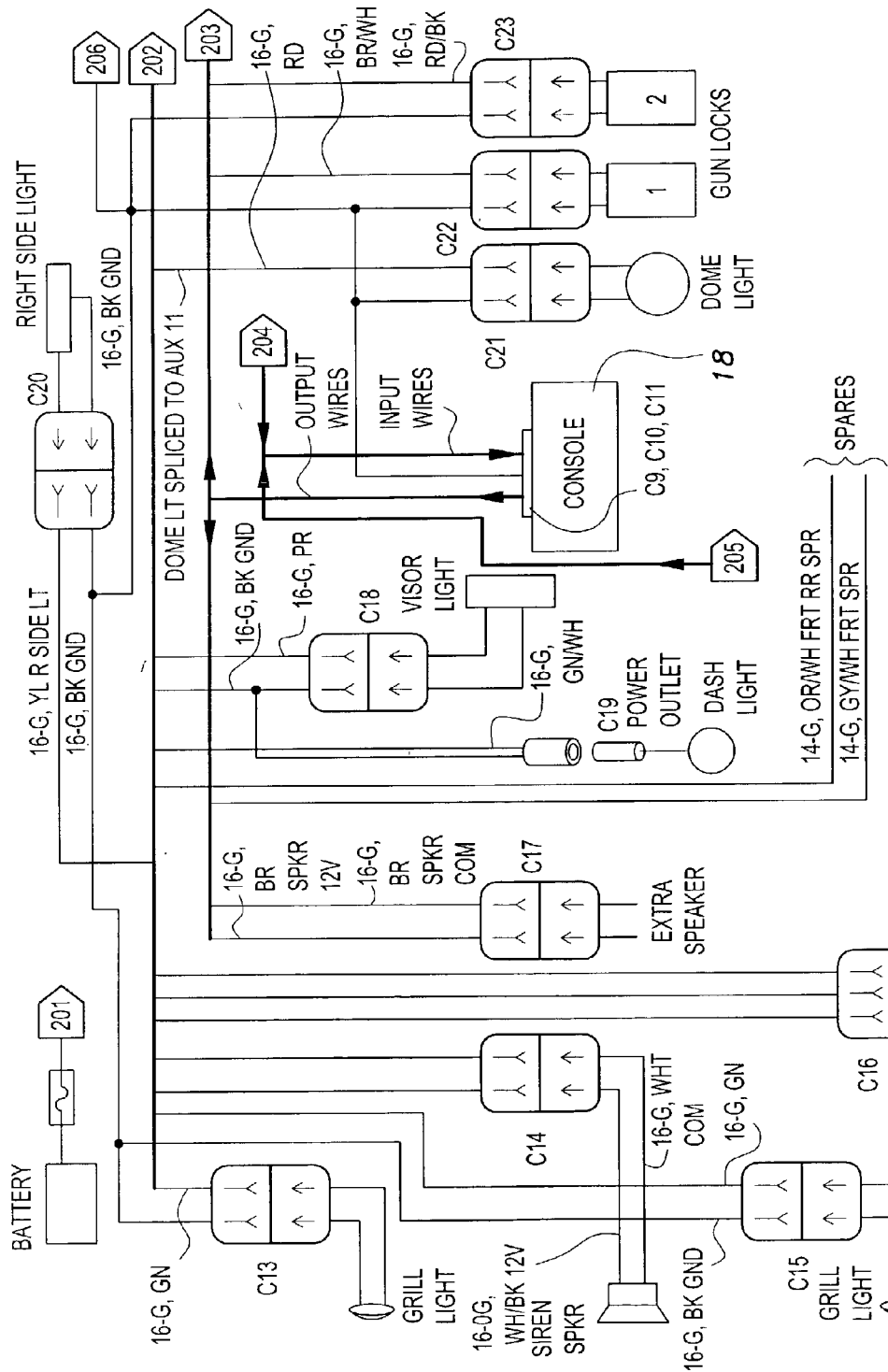
FIGS. 5A, 5B, 5C, 5D is a schematic diagram of wiring connections between the panels of the universal fleet electrical system according to the present invention.
Figure 5B:
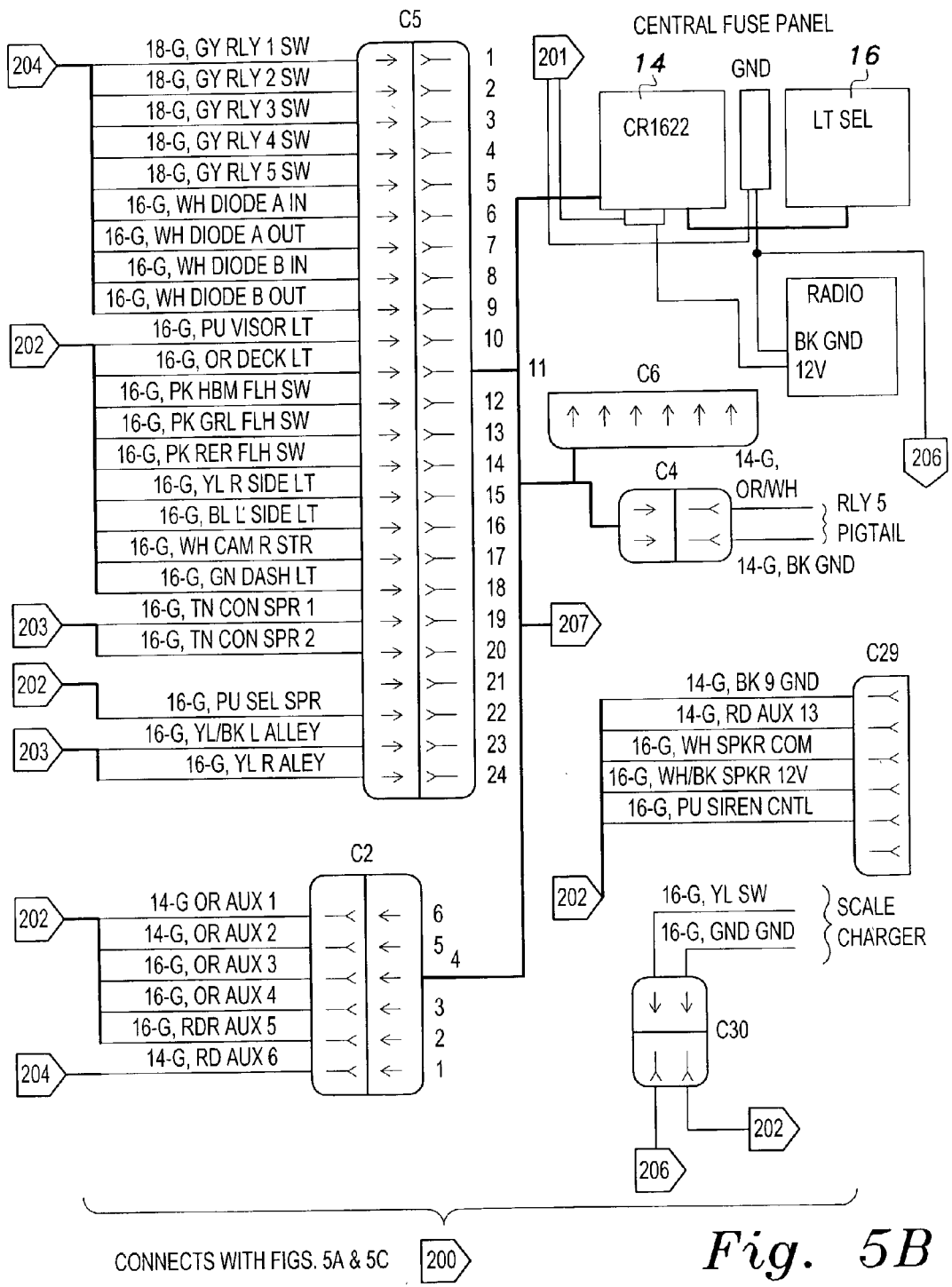
Figure 5C:
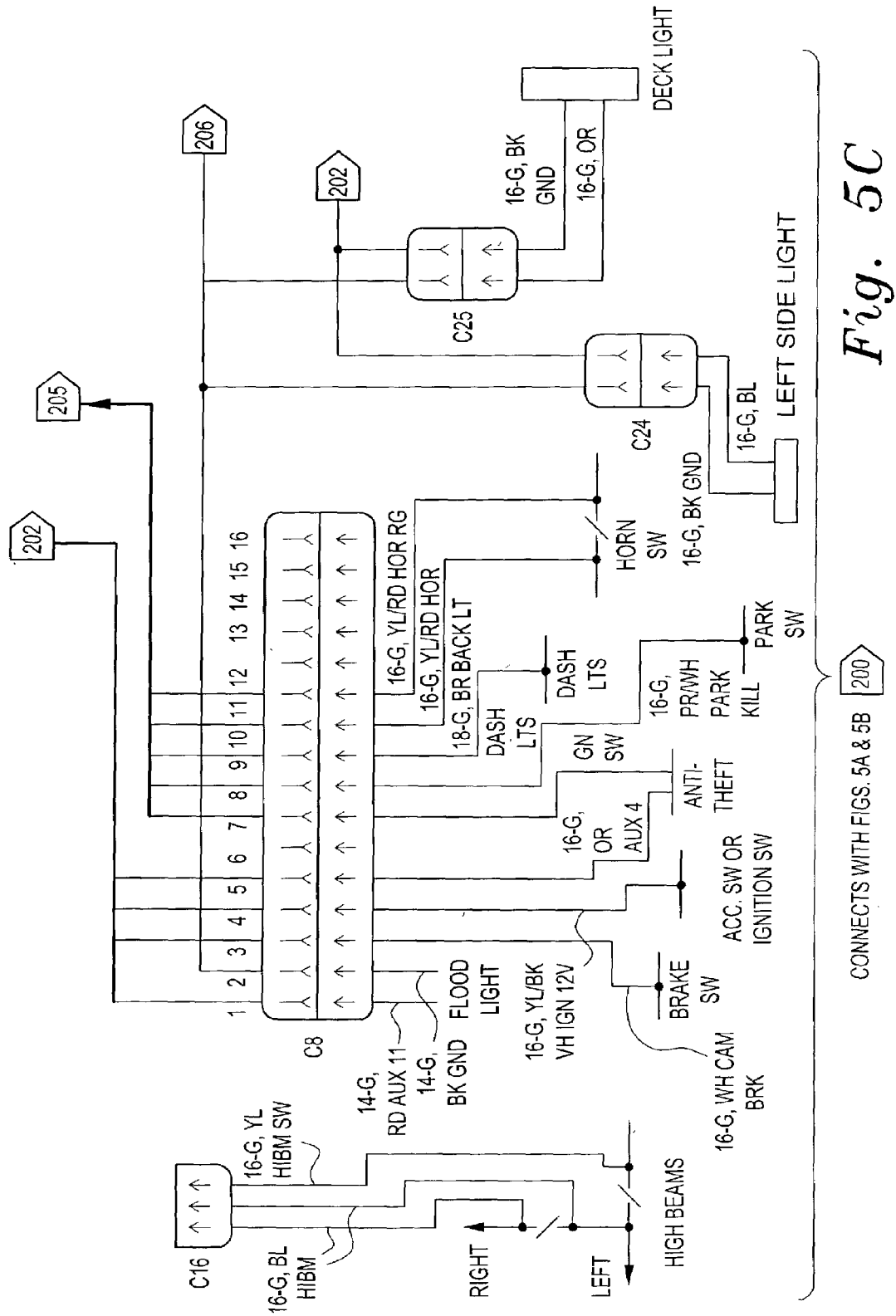
Figure 5D:
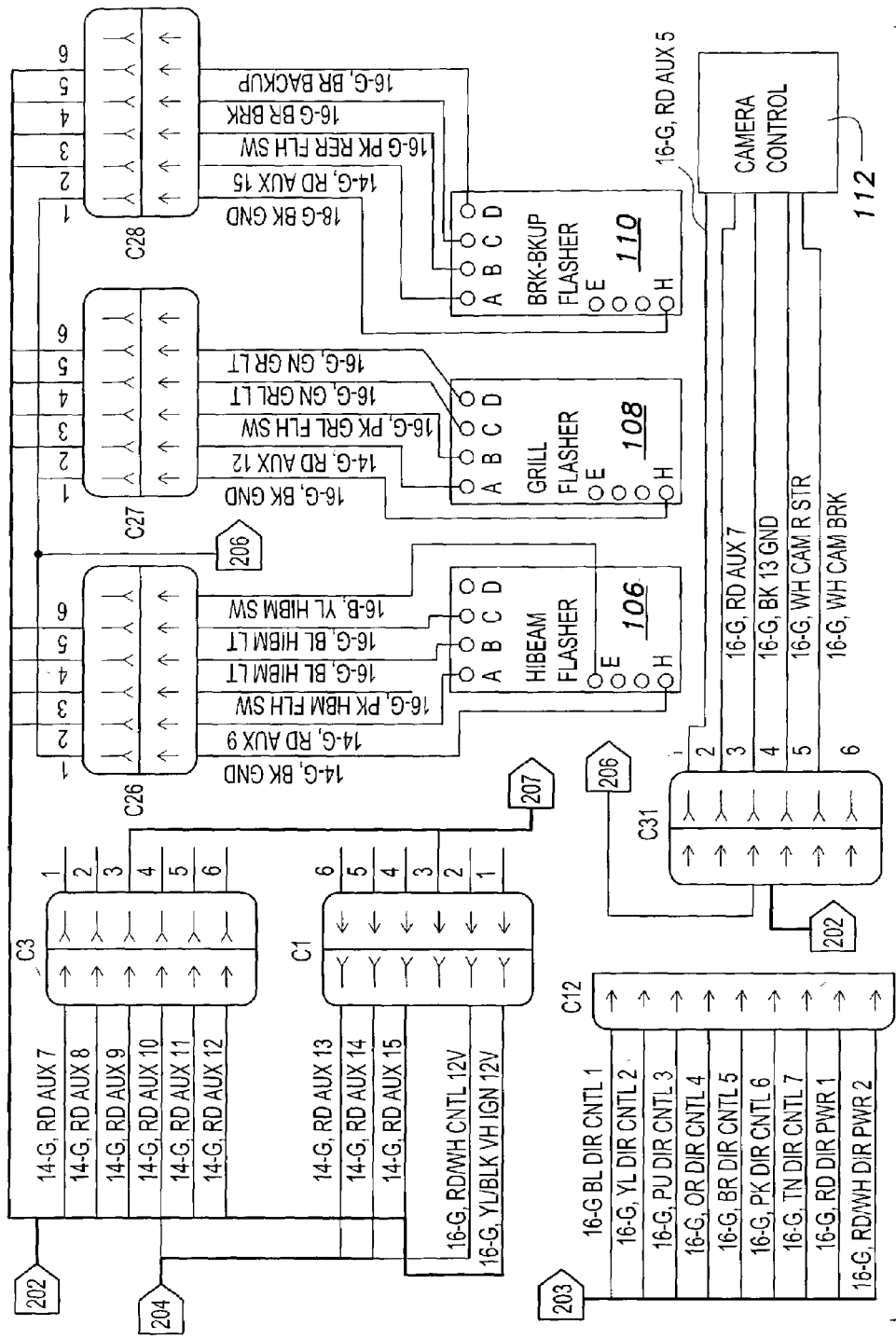

FIGS. 4A–4C is a schematic diagram of a console panel 18 according to the present invention. A plurality of user operable control switches are disposed on the console panel 18. The console panel 18 contains at least three lighting level switches, designated level 1 62, level 2 64, and level 3 66. The switches are shown as normally open toggle switches in the drawings, although the type of switch (toggle, slide, push button, etc.) is not critical. One contact of each switch is connected to the control circuit on fuse panel 14 via connectors C1, C9, and intermediate wiring, and is therefore always hot. The other contact of the lighting level 1 switch 62 is connected to one side of the solenoid coil of relay 1 36, the other side of the coil being connected to ground, so that when switch 62 is turned to the "on" position, the switch contacts of relay 1 36 close, thereby applying power to any accessories connected to relay 1 36 at terminal block 56. In similar fashion, the second contact of lighting level 2 switch 64 is connected to the solenoid coil of relay 2 38 and the second contact of lighting level 3 switch 66 is connected to the solenoid coil of relay 3 40 to control power to the accessories connected to those relays at terminal block 56.

In some circumstances it may be desired to connect the same lighting accessory to more than one lighting level switch. For example, it may be desired to have lighting level 1 switch 62 control turning all lighting accessories on and off, while the hi-beams is one of the accessories controlled by lighting level 2 switch 64 and the brake and backup flashers are controlled by lighting level 3 switch 66. In this case the anodes of the two diodes 51a and 51b on fuse panel 14 are connected to the second contact of lighting level 1 switch 62 via connector C5, C9, and intermediate wiring. The cathode of diode 51a is connected to the second contact of lighting level switch 2 64, and the cathode of diode 51b is connected to the second contact of lighting level 3 switch 66. In this manner diode 51a prevents feedback from the hi-beams circuit when switches 62 and 64 are turned on simultaneously, and diode 51b prevents feedback from the brake and backup light circuit when switches 62 and 66 are turned on simultaneously.

The console panel includes a Take Down switch 68 for controlling those light accessories which shine a blinding light into a motorist's vehicle when the motorist is pulled over by a police vehicle. One contact of the Take Down switch 68 is connected to the control circuit 50 and is always hot, while the second contact is connected to the solenoid coil of relay 4 42 to control the lighting accessories connected to relay 4 42 at terminal block 56. The trunk switch 70 has one contact connected to the control circuit 50 and is always hot, while the second contact is connected to the solenoid coil of relay 5 44 to control any accessories which may be connected to relay 5 44 in the trunk at pigtail connector C4.

The console panel 18 may have a scale switch 72 which is supplied with power via the Aux 2 fuse and delivers power at C30 to a scale charger which some police vehicles are equipped with for weighing trucks and other vehicle loads. The console panel 18 may have a scan switch 74 which is supplied with power via the Aux 2 fuse and delivers power to a scanner 76 located near the dash. The spare switch 80, left alley switch 82 and right alley switch 84 are shown being supplied with power at one contact through Aux fuse 6. The other contact of the left 82 and right 84 alley switches are connected to the light bar via connectors C9, C5, C6 and intermediate wiring. The other contact of the spare switch 80 is connected to spare wires 60 in the lighting selection junction box 16. As an example of how spare switch 80 may used, suppose it is desired to separately control the deck lights by spare switch 80. A male spade terminal is connected to the tan spare wire 60 labeled "CON SPR 1 " in FIG. 3. The female spade terminal 58 for the orange wire labeled "DECK LT" in FIG. 3 is detached from terminal 3B of terminal block 58 and connected to the male spade terminal, thus connecting power to the deck light through spare switch 80. The console panel 18 may contain push button switches 86 for gun locks which secure guns, such as rifles or shotguns, within the police vehicle A.

The console panel 18 switches are generally wired through the harness terminating at connector C9. Connector C9 also delivers power to a number of other accessory devices which have their own built-in switches for applying and removing power. C9 connects these devices to the various auxiliary circuits on fuse panel 14. The accessory devices may include a siren control 87, Mobile Dispatch Terminal (MDT) 88, portable radio 90, flashlight 92, map light 94, directional or arrow stick control head 95 (control head 95 outputs control signals to the arrow stick through wiring harness connectors C11 and C12) and a 2 way radio control head 96. Power may also be applied to a triple power outlet 98, which permits various accessories such as a cellphone 100 or computer inverter 102 to be connected through cigarette lighter plugs and the like. Several of these accessories may be supplied with power through a programmable timer delay 104. Programmable timer delays are conventional devices well known in the art for shutting off power to an accessory a predetermined time after the ignition switch is turned to the off position in order to prevent battery drain. An example of a programmable timer delay 104 suitable for use with the present invention is a model DR-33 programmable timer made by Minstar Technologies, Inc. of Grand Rapids, Minn. The accessory devices may be connected to the ground buss 26 through the harness wires terminating at connector C10.

FIGS. 5A–5D is a schematic wiring diagram showing how the various components of the universal fleet electrical system 10 (fuse panel 14, lighting selection junction box 16, and console panel 18) are connected by universal wiring harness 20 to the various accessories in the police vehicle A. The majority of the wiring has previously been discussed in connection with FIGS. 1–4 and will not be repeated. FIG. 5 does show some additional connections to the police vehicle A primary electrical system. Referring to connector C8, the wiring harness 20 is connected to the vehicle's brake switch, ACC or ignition switch, anti-theft switch (gun lock switch), park switch, and dash lights by tapping into the vehicle's existing wiring system using a convention crimp type connector to tap into the wiring. For example, the tap into the ignition or ACC switch is connected via connectors C8, C1 and intermediate harness wiring to the ignition relay 46 solenoid coil, so that when the ignition switch is turned to the "ON" position, the solenoid is energized, closing the relay's switch contacts and connecting Auxiliary circuits 1–4 to the 12 volt buss bar 24 through the ignition relay fuse. The harness 20 connects to the horn switch by splicing into the existing primary electrical system. Likewise, referring to connector C16, the hi-beams are connected to the wiring harness 20 by splicing into the vehicles electrical system.

FIG. 5 also shows additional accessories (hi-beam flasher 106, grill flasher 108, brake and back-up flasher 110, camera control 112, etc.) and the optional runs of harness 20 and cable connectors provided for connecting the accessories, together with the color coding scheme for the wiring. It bears repeating that the universal wiring harness 20 relies both upon color coding and stamped indicia on the wiring to permit rapid identification of the cabling, thereby reducing maintenance, servicing and troubleshooting time. The optional portions of the wiring harness (connectors C17–C31) may be customized or made to order as desired.

It will be noted that various additions may be made to the conventional universal fleet electrical system consistent with the foregoing description. For example, the wiring harness may optionally be expanded to include wiring for a second siren speaker, dash and visor lights, side and mirror lights, a diode harness, a second gun lock, a directional cable and additional forty ampere relay harnesses added to the fuse panel so that five additional relays can be added. Such modifications are obvious and well within the capability of one skilled in the art.

Figure 6:
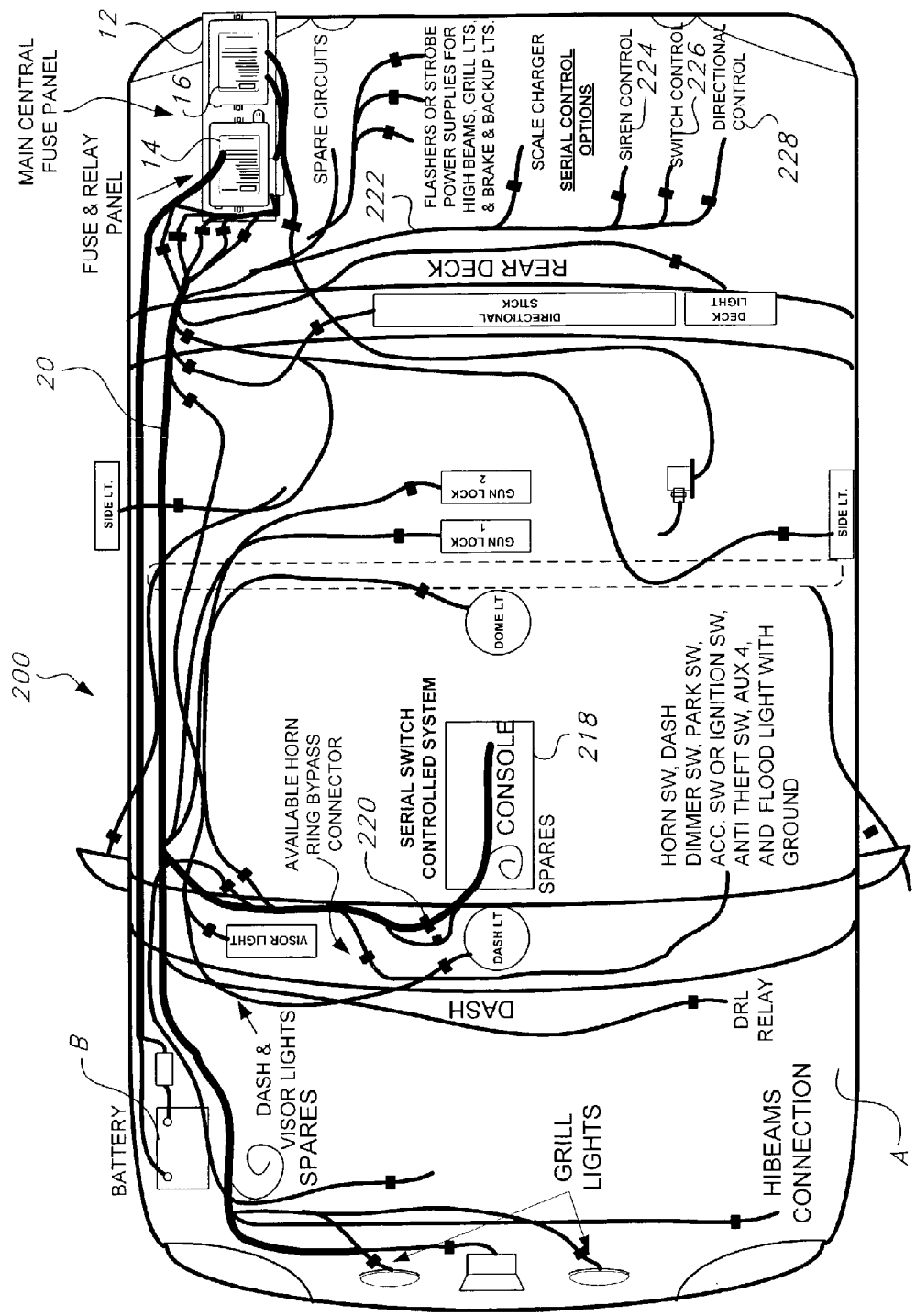
FIG. 6 is a schematic view of a universal fleet electrical system adapted for use with a serial controller as seen from the top of a police vehicle showing disposition of the components of the system according to the present invention.

FIG. 6 shows a schematic diagram of a police vehicle equipped with a universal fleet electrical system as described above which has been modified to adapt the system for use with a microprocessor-based serial controller. The use of serial controllers is known in the art for reducing the number of control switches on the console with a corresponding reduction in the volume of switch wiring. Serial controllers provide a consolidated switch panel which considerably facilitates the use of emergency accessory equipment. Serial controllers are available in a variety of configurations. In one configuration, exemplified by the CENCOM (CenCom is a trademark of Whelen Engineering Company, Inc. of Chester, Connecticut) made by Whelen Engineering Company, Inc., and by the disclosure of U.S. Patent 5,296,840, assigned to Federal Signal Corporation. In this style of controller, a control head in the console area is linked to a control unit in the trunk by a serial communications cable, which may be a twisted pair of wires. The control unit is connected to relays which switch accessories, such as lighting, sirens, etc., in response to operation of button, slide or rotary switches on the control head. The control head may be programmable by software to configure the control head switches. A similar serial controller which may be used with the present invention is a model F/S SS2000, made by Federal Signal Corporation. In a second configuration, as exemplified by the Smart Link System, also made by Whelen Engineering Company, Inc., a model MPC01 multi-purpose controller is installed on the console and is connected to several relays in the trunk by a serial communications cable. The relays may include a siren amplifier control, a current switch control for controlling lights, a directional light arrow control relay, etc.

Figure 7:
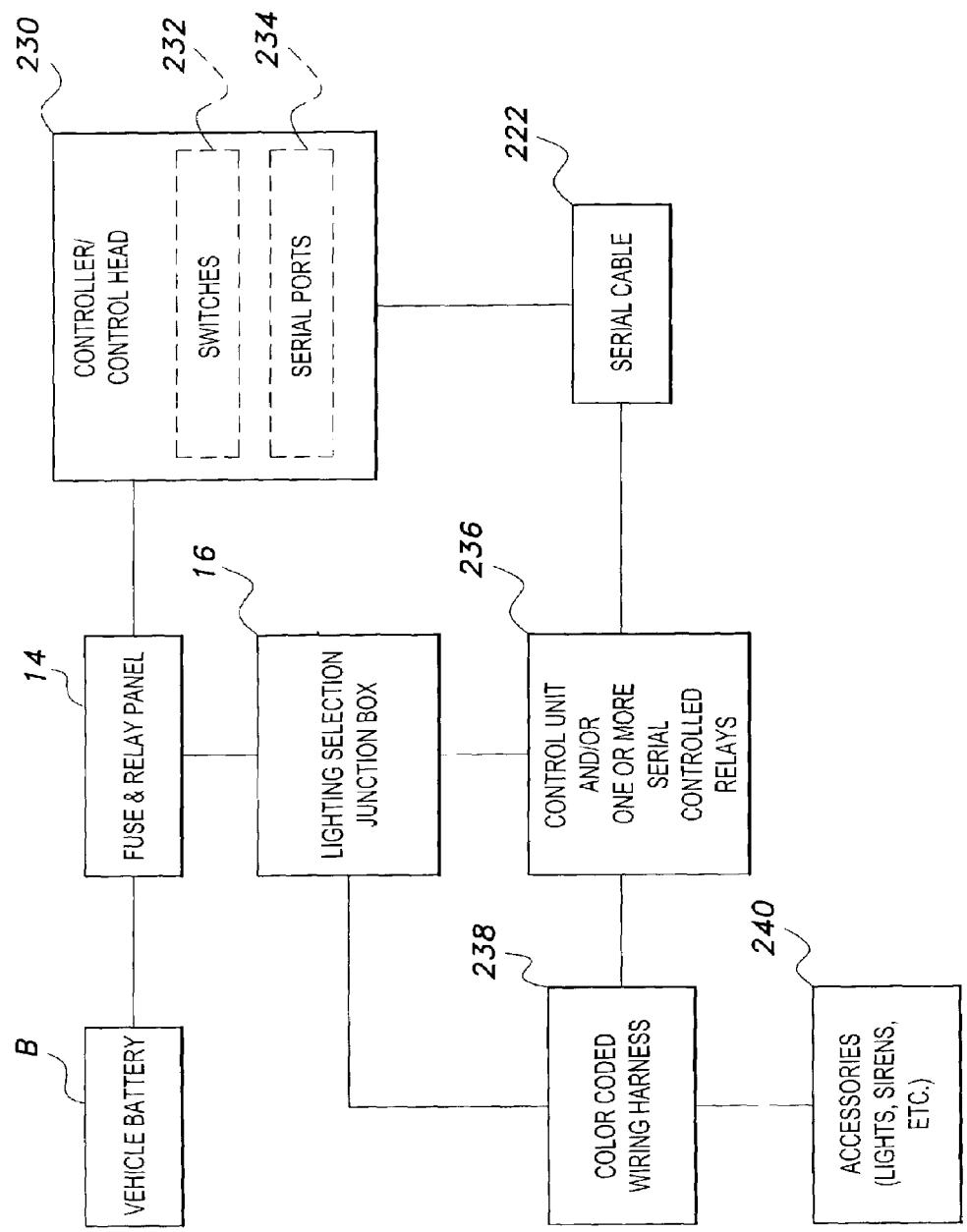
FIG. 7 is a block diagram of the universal fleet electrical system of FIG. 6.
Figure 8:
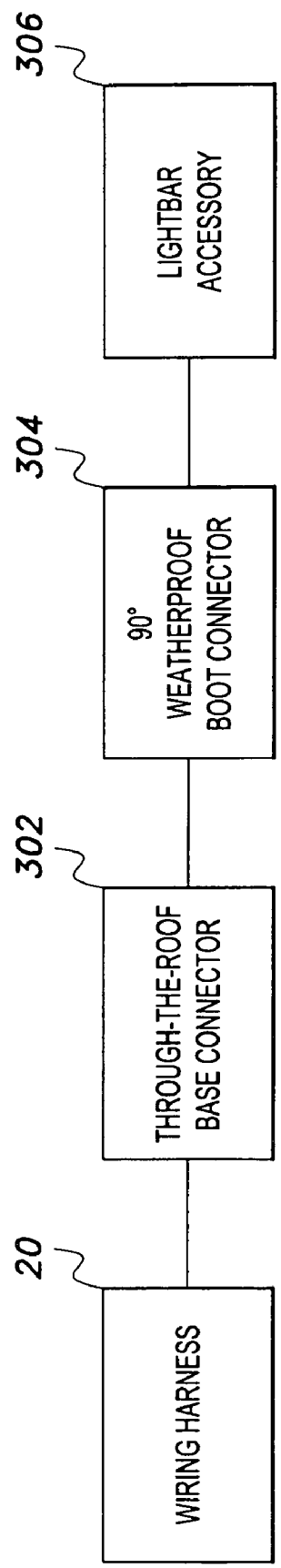
FIG. 8 is a block diagram of a light bar connector according to the present invention.

The universal fleet electrical system shown in FIGS. 6 and 7 simplifies such installation. FIG. 6 is similar to FIG. 1, showing the modified universal fleet electrical system 200 components in a police vehicle A. As before, the system includes a standardized power distribution panel 12, again encompassing a fuse panel 14 and a lighting selector junction box 16. The power distribution panel 12 is preferably disposed in the trunk of the vehicle. However, whereas a conventional universal fleet electrical system had a console panel 18 which included a plurality of separately wired switches for controlling the various accessory lights, horns, sirens, etc., the console panel 218 of the present invention is modified by eliminating separate switch wiring for the siren, light switches, directional arrow controls, and other accessory devices which can be controlled by the serial controller, retaining separate switch wiring only for those devices not controlled by the serial controller, e.g., gun locks.

Instead, the wiring harness 20 includes power cables for the serial controller extending from the control fuse 50 and ground buss of the fuse panel 14 to the console 218 through a suitable wiring harness connector 220. The wiring harness 20 also incorporates a serial communications cable 222 which is connected to either a control unit in the case of a programmable system of the CenCom type, or to a serial siren control amplifier 224, serial current switch control 226, serial directional control 228, etc. in the case of a multi-function serial controller of the MPC01 type.

Referring to FIG. 7, the vehicle battery B supplies power to the universal fleet electrical system 200 through the fuse panel 14. As mentioned previously, the fuse panel 14 supplies power to the control head or multi-purpose serial controller 230 through the control fuse 50 (seen in FIG. 2A) and ground buss via the color coded wiring harness 20. The serial controller 230 includes a plurality of switches 232, which may be push button, slide, rotary, or other switches, and may include both dedicated and programmable switches in which the function of the switch is microprocessor controlled. The serial controller also includes at least one serial port 234. A serial communications cable 222 connects the serial port 234 to a control unit or one or more serial controlled relays 236. The color coded wiring of the lighting selector junction box 16, instead of being connected to individual switches in the console panel 16, is connected to the control unit or serial controlled relays, so that control of the lighting can be maintained through the lighting selector junction box 16 as described above. Color coded wiring 238 is used to connect the lighting selector junction box 18 or serial controlled relays 236 to the accessories 240. Hence, the modified universal fleet electrical system 200 simplifies installation of a serial controller by incorporating the necessary wiring in the wiring harness 20, while retaining the advantages of the conventional universal fleet wiring system 10 described above.

It is to be understood that the present invention is not limited to the embodiments described above, but encompasses any and all embodiments within the scope of the following claims.

I claim:

1. A universal fleet electrical system for distributing electrical power to a plurality of aftermarket accessories in a fleet vehicle, comprising:
   (a) a fuse panel adapted for connection to a fleet vehicle's battery, wherein said fuse panel further comprises:
      a positive voltage buss bar adapted for connection to a positive terminal of the fleet vehicle's battery;
      a ground buss adapted for connection to a negative terminal of the fleet vehicles battery;
      a pair of main power fuses, each main power fuse branching into a plurality of normally hot auxiliary circuits, each auxiliary circuit having a fuse for protection of the auxiliary circuit, the main power fuses being directly connected to said positive voltage buss bar so that the auxiliary circuits are normally hot, each auxiliary circuit having wires with red insulation and bearing indicia identifying the circuit for quick identification;
      a plurality of lighting circuit relays, each relay having a solenoid and normally open switch contacts, each relay further having a fuse in series with the relay solenoid; and
      an ignition relay having a solenoid tapped into the fleet vehicle's ignition switch and having normally open switch contacts connected to a plurality of ignition controlled auxiliary circuits, each ignition controlled auxiliary circuit having an auxiliary fuse and having wires with orange insulation and bearing indicia for rapid circuit identification; and
      a control fuse connected to said positive voltage buss bar, a power cable being connected to the control fuse and to said ground buss;
   (b) a lighting selection junction box electrically connected to said fuse panel, wherein said light selector junction box further comprises:
      a plurality of lighting circuits, each lighting circuit being connected to the switch contacts of a separate one of said plurality of lighting relays, each lighting circuit branching into a plurality of lighting subcircuits, each subcircuit having a fuse for circuit protection; and
      at least one terminal block having a plurality of terminals, each lighting subcircuit being connected to a separate terminal on said terminal block, each terminal having a spade push connector for attachment of a lighting subcircuit accessory wire;
      wherein a plurality of lighting subcircuit accessories are programmably connected to the switch contacts of a user selected lighting relay by connecting a push connector from the subcircuit accessory to a terminal on said terminal block;
   (c) a console panel having a plurality of user operable switches for controlling operation of a plurality of aftermarket accessories added to the fleet vehicle, the console panel being electrically connected to said fuse panel and said lighting selection box; and (d) a universal wiring harness electrically connecting said fuse panel, said lighting selection junction box, and said console panel, the wiring harness having a plurality of connectors distributed throughout the fleet vehicle adapted for connection to aftermarket accessories, the wiring harness further having a serial communications cable and a power cable and connector extending to a console area of the vehicle and adapted for connection to a serial controller incorporated therein.

2. The universal fleet electrical system according to claim 1, further comprising a plurality of color coded wires having one end connected to the terminal block of said lighting selector block and a second end adapted for connection to a serial controller.

3. The universal fleet electrical system according to claim 1, further comprising:
   (a) a control head having a plurality of switches and a serial port, said serial communications cable being connected to the serial port, the control head being disposed in a console area of the vehicle; and
   (b) a control unit disposed in a trunk of the vehicle, the control unit being connected to said lighting selector junction box and the aftermarket accessories.

4. The universal fleet electrical system according to claim 1, further comprising:
   (a) a multi-purpose serial controller having a plurality of switches and a serial port, said serial communications cable being connected to the serial port, the controller being disposed in a console area of the vehicle; and
   (b) a plurality of serial controlled relays disposed in a trunk of the vehicle, the relays being connected to said lighting selector junction box and the aftermarket accessories.

* * * * *